US010928883B2

United States Patent
Washio

(10) Patent No.: US 10,928,883 B2
(45) Date of Patent: Feb. 23, 2021

(54) SYSTEM MANAGEMENT DEVICE

(71) Applicant: NEC Corporation, Tokyo (JP)

(72) Inventor: Takuya Washio, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 16/242,198

(22) Filed: Jan. 8, 2019

(65) Prior Publication Data
US 2019/0227621 A1 Jul. 25, 2019

(30) Foreign Application Priority Data
Jan. 23, 2018 (JP) .............................. JP2018-008650

(51) Int. Cl.
| G06G 1/00 | (2006.01) |
| G06F 1/3287 | (2019.01) |
| G06F 1/3228 | (2019.01) |
| G06F 9/48 | (2006.01) |
| G06F 8/65 | (2018.01) |
| G06F 1/28 | (2006.01) |
| G06F 1/3203 | (2019.01) |

(52) U.S. Cl.
CPC .............. *G06F 1/3287* (2013.01); *G06F 1/28* (2013.01); *G06F 1/3228* (2013.01); *G06F 8/65* (2013.01); *G06F 9/4881* (2013.01); *G06F 1/3203* (2013.01)

(58) Field of Classification Search
CPC ........ G06F 1/3287; G06F 1/28; G06F 1/3228; G06F 8/65; G06F 9/4881
USPC ........................................................ 713/300
See application file for complete search history.

(56) References Cited

U.S. PATENT DOCUMENTS

| 2009/0313630 A1* | 12/2009 | Hori ..................... G06F 8/656 718/102 |
| 2013/0326495 A1* | 12/2013 | Reunamaki ............. H04W 4/80 717/173 |
| 2014/0096126 A1* | 4/2014 | Gourlay .................. H04L 67/42 717/173 |
| 2014/0160507 A1* | 6/2014 | Utsumi .............. H04N 1/00962 358/1.13 |
| 2015/0317214 A1* | 11/2015 | Kettley ............... G06F 11/0751 714/19 |

(Continued)

FOREIGN PATENT DOCUMENTS

| JP | 2003-162515 A | 6/2003 |
| JP | 4545225 B2 | 9/2010 |

(Continued)

OTHER PUBLICATIONS

Japanese Office Action for JP Application No. 2018-008650 dated Dec. 11, 2018 with English Translation.

*Primary Examiner* — Volvick Derose

(57) ABSTRACT

A system management device connected with a plurality of computation nodes includes a memory including a program instruction and a processor connected with the memory. The processor creates a list of computation nodes in which update of software is to be performed, in accordance with an input software update request, and detects a computation node in an idle state satisfying a condition for power saving, in accordance with an input power-saving operation request. When the computation node detected by the processor is on the list, the processor deactivates the detected computation node for power saving after the software thereof is updated.

3 Claims, 9 Drawing Sheets

(56) References Cited

U.S. PATENT DOCUMENTS

2016/0100362 A1* 4/2016 Palanisamy ....... H04W 52/0212
370/311

FOREIGN PATENT DOCUMENTS

| JP | 2014-115776 A | 6/2014 |
| JP | 2015-197838 A | 11/2015 |

* cited by examiner

FIG. 2

| NODE ID | STATUS | ELAPSED TIME | SOFTWARE ID | VERSION | ... | SOFTWARE ID | VERSION |
|---|---|---|---|---|---|---|---|
| COMPUTATION NODE 2-1 | IDLE | 5 MINUTES | SW01 | 01 | ... | SW0M | 02 |
| COMPUTATION NODE 2-2 | JOB EXECUTION | 10 MINUTES | SW01 | 01 | ... | SW0M | 02 |
| ... | ... | ... | ... | ... | ... | ... | ... |
| COMPUTATION NODE 2-N | IDLE | 5 MINUTES | SW01 | 01 | ... | SW0M | 02 |

SYSTEM MANAGEMENT DEVICE

INCORPORATION BY REFERENCE

The present invention is based upon and claims the benefit of priority from Japanese patent application No. 2018-008650, filed on Jan. 23, 2018, the disclosure of which is incorporated herein in its entirety by reference.

TECHNICAL FIELD

The present invention relates to a system management device, a computer system control method, and a program recording medium.

BACKGROUND ART

Various types of computer systems having a plurality of computation nodes have been proposed and practically used. For example, there is a high-speed processing computing (HPC) clusters performing parallel processing application program at a high speed by a plurality of computation nodes that operate cooperatively.

JP 4545225 B (Patent Literature 1) describes an exemplary method of updating (modifying) software installed in each of the computation nodes in a computer system. In the software updating method described in Patent Literature 1, when correction data is input, operation is stopped sequentially in computation nodes not executing a job and correction of software is applied. Thereby, update of the software is performed while keeping operation of the entire computer system.

Further, JP 2003-162515 A (Patent Literature 2) describes an exemplary method for saving power in the entire computer system having a plurality of computation nodes. In the power saving method described in Patent Literature 2, a computation node is deactivated when the computation node is in an idle state.

Patent Literature 1: JP 4545225 B
Patent Literature 2: JP 2003-162515 A

In a computer system having a plurality of computation nodes as described above, a mechanism of performing software update by sequentially stopping operation of some computation nodes and a mechanism for saving power in the entire system by deactivating some computation nodes have been proposed. However, these two mechanisms are independent of each other, and are not related to each other. As such, in a computer system having the two mechanisms, there is a possibility that in a state where some computation nodes are deactivated for power saving, some other computation nodes may be deactivated for software update. When such a condition occurs, there is a possibility that computation nodes to which jobs are assignable are in short extremely in the worst case, whereby job operation of the computer system might be stopped.

SUMMARY

An exemplary object of the present invention is to provide a system management device that solves the problem described above.

A system management device according to an exemplary aspect of the present invention is a system management device connected with a plurality of computation nodes.

The device includes a memory including a program instruction, and a processor connected with the memory.

The processor is configured to execute the program instruction to create, among the computation nodes, a list of computation nodes in which update of software is to be performed, in accordance with an input software update request, detect, from among the computation nodes, a computation node in an idle state satisfying a condition for power saving, in accordance with an input power-saving operation request, and when the detected computation node is on the list, deactivate the computation node for power saving after the software thereof is updated, while when the detected computation node is not on the list, deactivate the computation node for power saving as soon as possible.

A method of controlling a computer system, according to another exemplary aspect of the present invention, is a method of controlling a computer system including a plurality of computation nodes.

The method including creating, among the computation nodes, a list of computation nodes in which update of software is to be performed, in accordance with an input software update request, detecting, from among the computation nodes, a computation node in an idle state satisfying a condition for power saving, in accordance with an input power-saving operation request, and when the detected computation node is on the list, deactivating the computation node for power saving after the software thereof is updated, while when the detected computation node is not on the list, deactivating the computation node for power saving as soon as possible.

A non-transitory computer readable medium, according to another aspect of the present invention, stores a program comprising instructions for causing a computer connected with a plurality of computation nodes to create, among the computation nodes, a list of computation nodes in which update of software is to be performed, in accordance with an input software update request, detect, from among the computation nodes, a computation node in an idle state satisfying a condition for power saving, in accordance with an input power-saving operation request, and when the detected computation node is on the list, deactivate the computation node for power saving after the software thereof is updated, while when the detected computation node is not on the list, deactivate the computation node for power saving as soon as possible.

With the configuration described above, the present invention is able to realize power saving and software update of computation nodes without stopping job operation of the computer system.

BRIEF DESCRIPTION OF THE DRAWINGS

FIG. 2 is a diagram illustrating an example of a computation node status table according to the first exemplary embodiment of the present invention;

EXEMPLARY EMBODIMENTS

Next, exemplary embodiments of the present invention will be described in detail with reference to the drawings.

First Exemplary Embodiment

Figure 1:
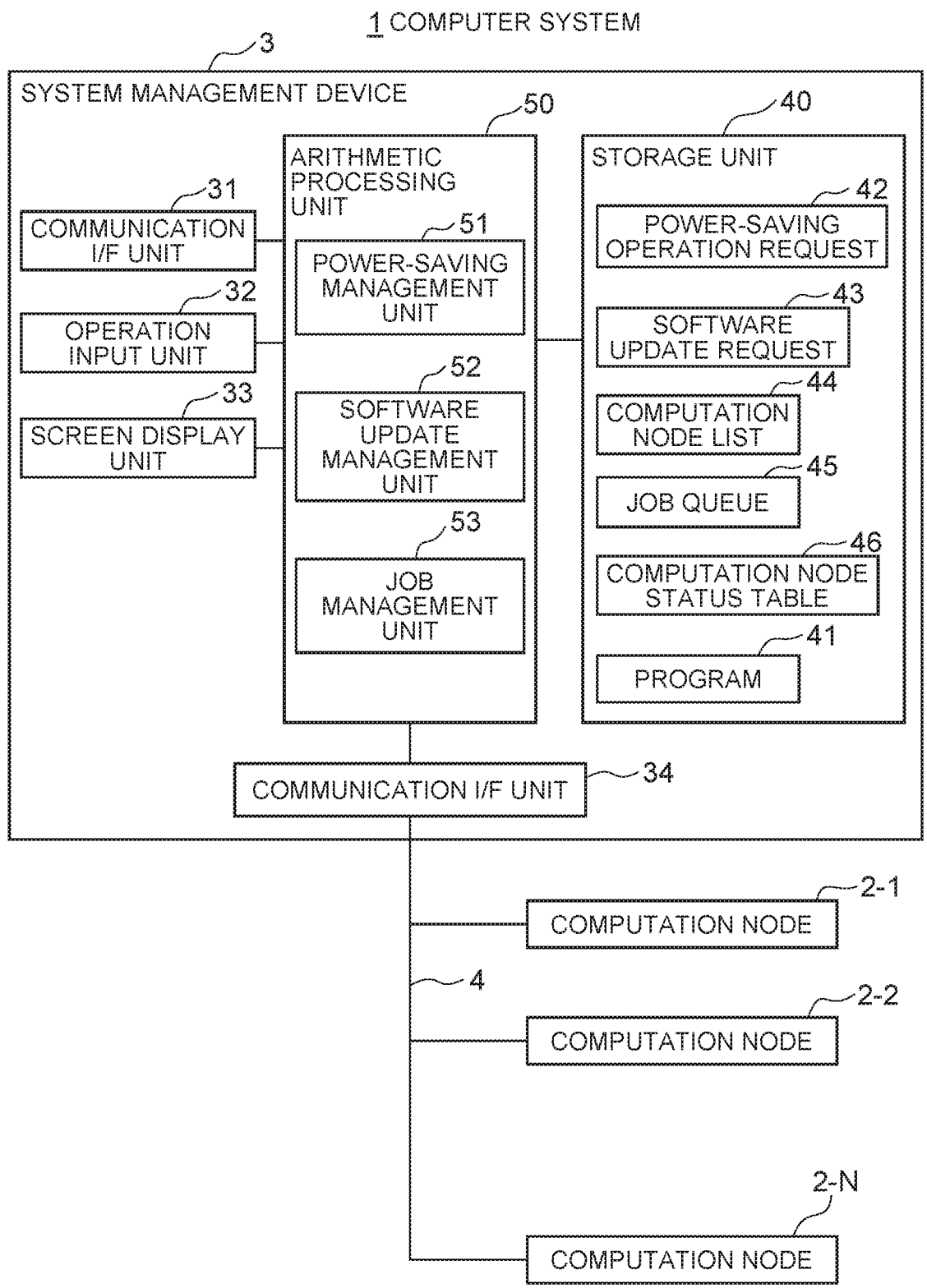
FIG. 1 is a block diagram illustrating a computer system according to a first exemplary embodiment of the present invention.

Referring to FIG. 1, a computer system 1 according to a first exemplary embodiment of the present invention includes a plurality of computation nodes 2-1 to 2-N, and a system management device 3.

The computation nodes 2-1 to 2-N are computers each having at least a processor and a memory. The computation nodes 2-1 to 2-N are connected with other computation nodes and the system management device 3 via a bus 4. The computation nodes 2-1 to 2-N are configured to operate in cooperation with each other to thereby execute a parallel processing application program. In each of the computation nodes 2-1 to 2-N, an operating system (OS) and various application programs are installed. Each of the computation nodes 2-1 to 2-N takes any of a deactivated state, an idle state, a job execution state, and a software update state. A deactivated state is a state in which power supply is disconnected and the computation node is not operating. An idle state is a state in which the computation node operates normally and a job can be submitted, but no job is running. A job execution state is a state in which the computation node is executing a job. A software update state is a state in which power supply is on and the computation node is in operation, but a job cannot be submitted because software is being updated.

The system management device 3 is configured to preside over control of the entire computer system 1. The system management device 3 includes a communication interface (I/F) unit 31, an operation input unit 32, a screen display unit 33, a communication I/F unit 34, a storage unit 40, and an arithmetic processing unit 50.

The communication I/F unit 31 includes a dedicated data communication circuit, and is configured to perform data communication with various devices such as an external terminal connected via a wired or wireless communication line. The operation input unit 32 includes operation input devices such as a keyboard and a mouse, and is configured to detect an operation by an operator and output it to the arithmetic processing unit 50. The screen display unit 33 includes a screen display device such as LCD a liquid crystal display (LCD) or a plasma display panel (PDP), and is configured to display, on the screen, various types of information such as an operation menu in accordance with an instruction from the arithmetic processing unit 50. The communication I/F unit 34 includes a dedicated data communication circuit, and is configured to perform data communication between the computation nodes 2-1 to 2-N connected via the bus 4.

The storage unit 40 includes a storage device such as a hard disk or a memory, and is configured to store processing information and a program 41 necessary for various types of processing in the arithmetic processing unit 50. The program 41 is configured to implement various processing units by being read into the arithmetic processing unit 50 and executed. The program 41 is read, in advance, from an external device or a storage medium via a data input and output function such as a communication I/F unit 31, and is stored in the storage unit 40. Main processing information stored in the storage unit 40 includes a power-saving operation request 42, a software update request 43, a computation node list 44, a job queue 45, and a computation node status table 46.

The power-saving operation request 42 is a message requesting power saving. The power-saving operation request 42 may include a condition for power saving. For example, a condition for power saving may include a condition for a computation node to be deactivated or an upper limit value of the number of computation nodes to be activated. A condition for a computation node to be deactivated may include that an idle state is continued for a predetermined time or longer, that there is no assignable job, or the like. When a condition for power saving is not included in the power-saving operation request 42, a previously set condition for power saving may be applied.

The software update request 43 is configured to include identification information of a computation node subjected to software update, identification information and the version of software, and updated software and the version thereof.

The computation node list 44 is a list of computation nodes in which software update is needed.

The job queue 45 is a storage unit for storing a submitted job.

The computation node status table 46 is a table for storing the status of the computation nodes 2-1 to 2-N. FIG. 2 illustrates an example of the computation node status table 46. The computation node status table 46 of this example is configured of rows corresponding to the computation nodes 2-1 to 2-N one to one. A row corresponding to one computation node has respective fields for node ID, status, elapsed time, software ID, and version. In the node ID field, identification information of the computation node is recorded. In the status field, any of a deactivated state, an idle state, a job execution state, and a software update state is recorded. In the elapsed time filed, a period of time in which the status in the status field continues is described. The software ID field and the version field are paired. A plurality of pairs can be described. In the software ID field, identification information of the software installed in the computation node is recorded, and in the corresponding version field, the version of the installed software is recorded.

The arithmetic processing unit 50 includes a microprocessor such as an MPU and its peripheral circuits. The arithmetic processing unit 50 is configured to read the program 41 from the storage unit 40 and executes it to thereby allow the hardware and the program 41 to operate in cooperation with each other to implement various processing units. Main processing units implemented by the arithmetic processing unit 50 include a power-saving management unit 51, a software update management unit 52, and a job management unit 53.

The power-saving management unit 51 is configured to deactivate computation nodes in an idle state, among the computation nodes 2-1 to 2-N, to save the power in the entire computer system 1. Specifically, the power-saving management unit 51 is configured to operate as described below.

The power-saving management unit 51 is configured that when the power-saving operation request 42 is input from the communication I/F unit 31 or the operation input unit 32, the power-saving management unit 51 stores the power-saving operation request 42 in the storage unit 40.

The power-saving management unit 51 is also configured to, after storing the power-saving operation request 42, detect a computation node in an idle state satisfying a condition for power saving. The power-saving management unit 51 is also configured to, when detecting a computation node in an idle state satisfying the condition for power saving, change the status of the detected computation node to a software update state. The power-saving management unit 51 is also configured to notify the software update management unit 52 of identification information of the detected computation node. The power-saving management unit 51 is also configured to, after the notification, when receiving a notification of identification information of a computation node in which a software updating process is completed from the software update management unit 52, deactivate the notified computation node and change the status of the computation node to a deactivated state.

The power-saving management unit 51 is also configured to, in a state where some computation nodes are deactivated for power saving, detect that job execution is completed in a computation node in a job execution state. The power-saving management unit 51 is configured to, when detecting the computation node in which job execution is completed, change the status of the detected computation node to a software update state, and notify the software update management unit 52 of the identification information of the computation node. The power-saving management unit 51 is also configured that each time it changes the status of one computation node to a software update state, the power-saving management unit 51 activates one computation node that is deactivated for power saving and changes the status thereof to an idle state. The power-saving management unit 51 is also configured to, after the notification, when receiving a notification of identification information of a computation node in which a software updating process is completed from the software update management unit 52, deactivate the notified computation node and change the status of the computation node to a deactivated state. Upon receipt of a notification that software update is entirely completed from the software update management unit 52, the power-saving management unit 51 stops the operation of detecting a computation node in which job execution is completed. Further, when a request to stop power-saving operation is input from the operation input unit 32 or the communication I/F unit 31, the power-saving management unit 51 stops the power-saving operation. At this time, if there is a computation node that is deactivated for power saving, it is activated and changed to an idle state.

The software update management unit 52 is configured to update the software of the computation nodes 2-1 to 2-N. Specifically, the software update management unit 52 is configured to operate as described below.

The software update management unit 52 is configured such that when the software update request 43 is input from the communication I/F unit 31 or the operation input unit 32, the software update management unit 52 stores the software update request 43 in the storage unit 40.

The software update management unit 52 is configured to, after storing the software update request 43 in the storage unit 40, compare the software update request 43 with the current software status of the computation nodes 2-1 to 2-N described in the computation node status table 46 to thereby create a computation node list 44 of computation nodes in which it is necessary to update the software, and store it in the storage unit 40. Next, in the case where the list 44 is not empty, the software update management unit 52 waits for notification of identification information of a computation node from the power-saving management unit 51. Then, when identification information of the computation nodes is notified, the software update management unit 52 checks whether or not the notified identification information is on the list 44. As a result of this check, when it is on the list 44, the software update management unit 52 accesses the computation node via the bus 4, and start a process to update the current software of the computation node to the updated software, based on the software update request 43. For example, the software update management unit 52 starts a program of performing software update provided to the computation node side. The software update of the computation node takes a time corresponding to the amount of update. The software update management unit 52 determines that the software update is completed when a predetermined time elapsed after starting the process of updating the software. Alternatively, the software update management unit 52 may monitor the progress of the software update started, and determine the completion thereof. Then, the software update management unit 52 deletes the identification information of the computation node in which the software update is completed from the list 44, and notifies the power-saving management unit 51 of the identification information as identification information of the computation node in which software update is completed. On the other hand, when identification information of the computation node notified from the power-saving management unit 51 is not on the list 44, the computation node has already competed software update or software update is not required originally. Accordingly, the software update management unit 52 promptly notifies the power-saving management unit 51 of the identification information of the computation node as identification information of a computation node in which software update is completed. When the list 44 becomes empty through the processes as described above, the software update management unit 52 displays, on the screen display unit 33, that software update according to the software update request 43 has been entirely completed, or/and transmits it to an external terminal via the communication I/F unit 31. The software update management unit 52 also notifies power-saving management unit 51 of the fact that the software update is entirely completed.

The job management unit 53 is configured to manage job operation. The job management unit 53 is configured to, when a job is submitted from the operation input unit 32 or the communication I/F unit 31, store the submitted job in the job queue 45. The job management unit 53 also detects a job waiting for execution from the job queue 45, and submits the detected job to a computation node to which the job can be assigned. Jobs include one requiring a computation node having software updated to a predetermined version, and one not requiring it. In the case of a job requiring a computation node having software updated to a predetermined version, the job management unit 53 searches the computation node status table 46 for the required number of computation nodes having software updated to the predetermined version and in an idle state, and submits the job to the searched computation nodes. The computation node to which the job is submitted is changed from an idle state to a job execution state, and when execution of the job is completed, it is changed to an idle state. Such a state of the computation node is detected by the job management unit 53, and is reflected in the computation node status table 46.

Next, operation of the computer system 1 according to the present exemplary embodiment will be described.

Figure 3:
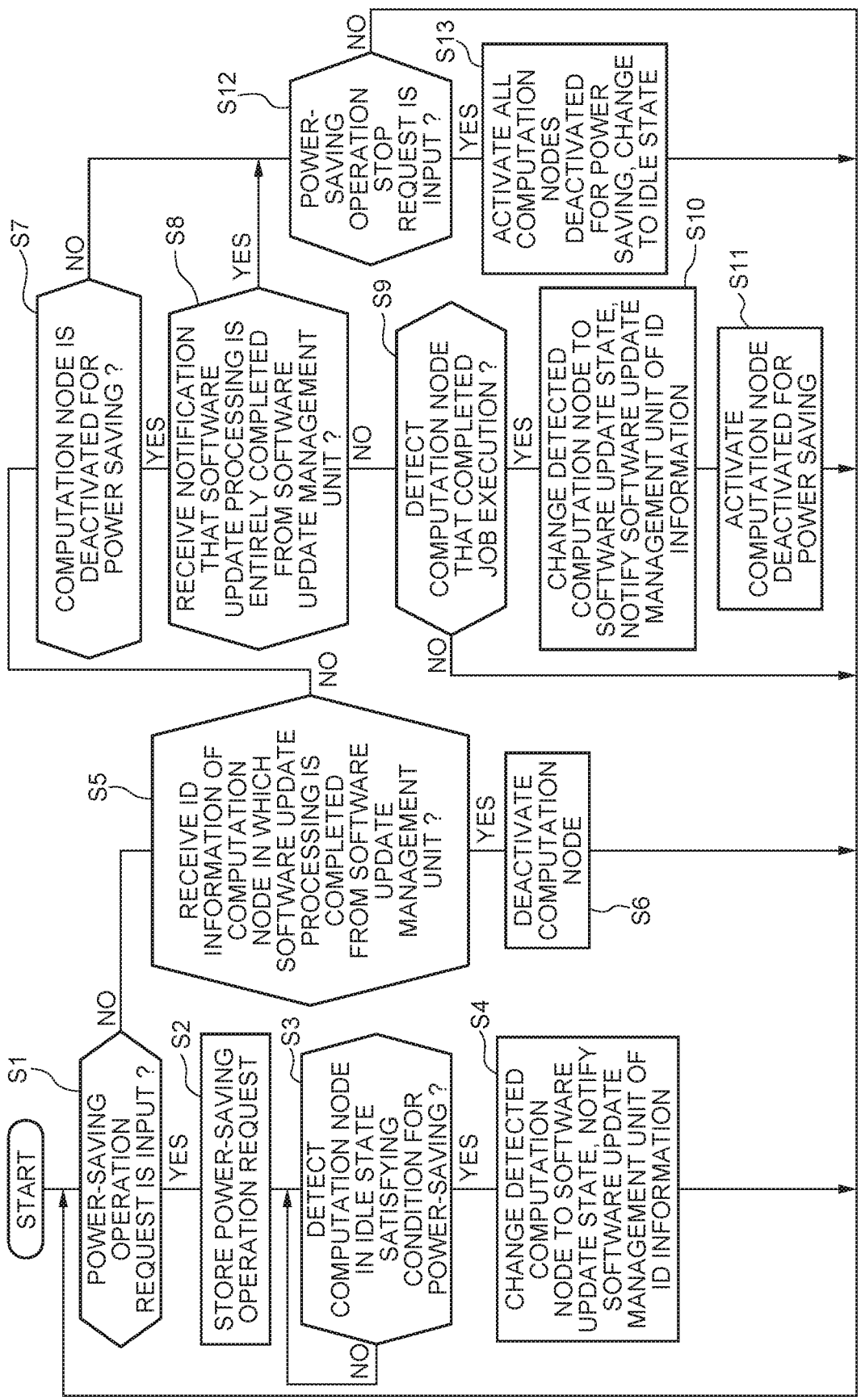
FIG. 3 is a flowchart illustrating an exemplary process performed by a power-saving management unit in the first exemplary embodiment of the present invention.
Figure 4:
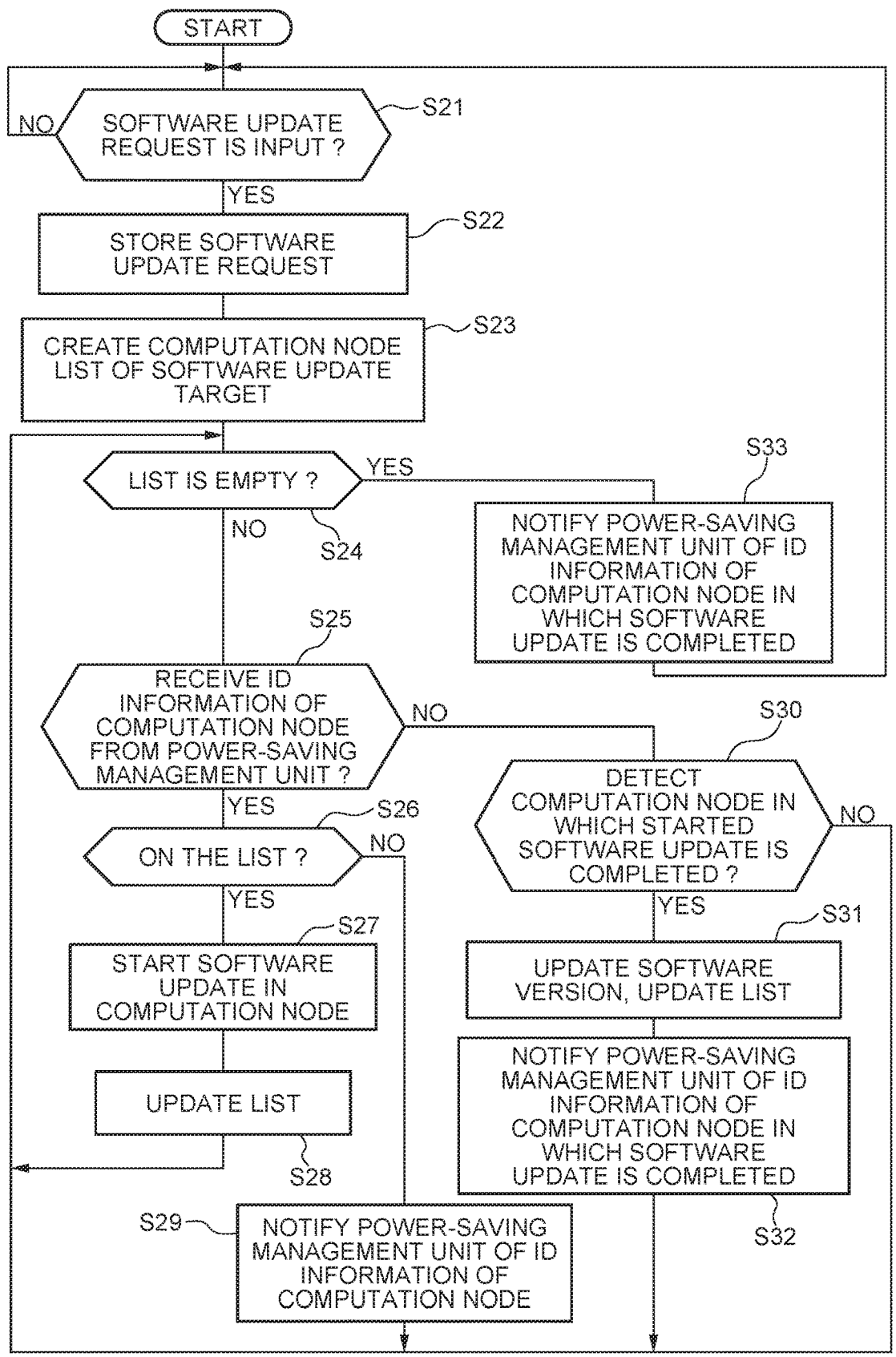
FIG. 4 is a flowchart illustrating an exemplary process performed by a software update management unit in the first exemplary embodiment of the present invention.

FIG. 3 is a flowchart illustrating exemplary processing performed by the power-saving management unit 51. FIG. 4 is a flowchart illustrating exemplary processing performed by the software update management unit 52. Hereinafter, operation of updating software of a computation node during power-saving operation will be described with reference to FIGS. 3 and 4.

When the power-saving operation request 42 is input from the communication I/F unit 31 or the operation input unit 32 (step S1), the power-saving management unit 51 stores the power-saving operation request 42 in the storage unit 40 (step S2). Next, the power-saving management unit 51 detects a computation node in an idle state satisfying a condition for power-saving (step S3). For example, the power-saving management unit 51 detects a computation node in which the status field in the computation node status table 46 of FIG. 2 is idle, the elapsed time field is a certain time or longer, and an assignable job is not in the job queue 45. The power-saving management unit 51 detects the predetermined number of such computation nodes at most. At that time, the power-saving management unit 51 may detect a computation node in an idle state satisfying the condition for power-saving, from among the computation nodes on the computation node list 44 stored in the storage unit 40. Then, upon detecting a computation node in an idle state satisfying the condition for power-saving, the power-saving management unit 51 changes the status field, in the computation node status table 46, of the detected computation node to a software update state, and notifies the software update management unit 52 of the identification information of the computation node (step S4).

On the other hand, when the software update request 43 is input from the communication I/F unit 31 or the operation input unit 32 (step S21), the software update management unit 52 stores the software update request 43 in the storage unit 40 (step S22). Next, the software update management unit 52 creates the computation node list 44 of the computation nodes in which software must be updated by comparing the identifier and the version of the software to be updated described in the software update request 43 with the identifier and the version of the software installed in each of the computation nodes 2-1 to 2-N described in the computation node status table 46, and stores the list 44 in the storage unit 40 (step S23). Then, in the case where the list 44 is not empty (step S24), the software update management unit 52 waits for notification of identification information of a computation node from the power-saving management unit 51 (step S25).

When the power-saving management unit 51 notifies the software update management unit 52 of the identification information of a computation node in an idle state satisfying the condition for power-saving, the software update management unit 52 detects the notification in the step S25. When the identification information of a computation node is notified, the software update management unit 52 checks whether or not the notified identification information is on the list 44 (step S26). When it is on the list 44, the software update management unit 52 starts processing to update the current software of the computation node to the updated software, based on the updated software included in the software update request 43 (step S27). Then, the software update management unit 52 records, on the list, the fact that software update of the computation node is started (step S28). In this record, it is also possible to describe an estimated time that the software update is to be completed. On the other hand, when the identification information of the computation node notified from the power-saving management unit 51 is not on the list 44, it means that the computation node has already completed software update or software update is not required originally. Accordingly, the software update management unit 52 notifies the power-saving management unit 51 of the identification information of the computation node (step S29). Then, the software update management unit 52 returns to step S24.

The software update management unit 52 detects whether or not software update of the computation node is completed, depending on whether a predetermined time elapses after starting the process of updating the software, or by monitoring the progress of the started software update (step S30). Then, when the software update of the computation nodes is completed, the software update management unit 52 updates the version of the software installed in the computation node in the computation node status table 46 based on the updated software, and deletes the identification information of the computation node from the list 44 (step S31). Then, the software update management unit 52 notifies the power-saving management unit 51 of the identification information of the computation node in which software update is completed (step S32). Then, the software update management unit 52 returns to step S24.

When returning to step S24, the software update management unit 52 determines again whether or not the computation node list 44 is empty. Then, when it is not empty, the software update management unit 52 repeats the operations of steps S25 to S32 described above. On the other hand, when the list 44 is empty, the software update management unit 52 displays on the screen display unit 33 that software update based on the software update request 43 has been entirely completed, or/and transmits it to an external terminal via the communication I/F unit 31, and notifies the power-saving management unit 51 of it (step S33).

When the power-saving management unit 51 detects, at step S5 of FIG. 3, the notification output at steps S29 and S32 by the software update management unit 52, the power-saving management unit 51 performs a process of deactivating the computation node of the notified identification information, and changes the status of the computation node in the computation node status table 46 to a deactivated state (step S6). When some of the computation nodes of the computer system 1 are in a deactivated state, the power consumption of the entire computer system is reduced.

When any computation node is deactivated for power saving (step S7), if the power-saving management unit 51 does not receive the notification issued at step S33 by the software update management unit 52, that is, a notification that software update has been completed entirely (step S8), the power-saving management unit 51 detects a computation node in which job execution is completed based on the computation node status table 46 (step S9). For example, the power-saving management unit 51 detects a computation node in which the status is rewritten from a job execution state to an idle state in the computation node status table 46. At that time, the power-saving management unit 51 may detect a computation node in which a job execution is completed, from among the computation nodes on the computation node list 44 stored in the storage unit 40. Next, the power-saving management unit 51 changes the status of the computation node in which job execution is completed to a software update state, and notifies the software update management unit 52 of the identification information thereof (step S10). The power-saving management unit 51 also activates one computation node that is deactivated for power saving, instead of the one computation node changed into a software update state at step S10 (step S11).

The notification issued at step S10 by the power-saving management unit 51 is received at step S25 of FIG. 4 by the software update management unit 52, and as described above, when software update is necessary, a process of updating software is started (steps S26 to S28), and the completion thereof is notified to the power-saving management unit 51 when it is completed (steps S30 to S32). When software update is not necessary, a similar notification issued promptly (step S29). These notifications are received at step S5 by the power-saving management unit 51, so that the computation node is deactivated. By dynamically changing the computation node to be deactivated for power saving and performing software update before the deactivation as described above, every computation node is eventually deactivated at least once for power saving. As a result, software update is completed in every computation node.

Then, when software update is completed in every computation node, the software update management unit 52 notifies the power-saving management unit 51 of the fact (step S33). Then, the software update management unit 52 returns to the process of step S21. Upon receipt of the notification, the power-saving management unit 51 does not perform the processes of steps S9 to S11. This eliminates wasteful switching of computation nodes to be deactivated for power saving.

Then, when a power-saving operation stop request is input (step S12), the power-saving management unit 51 activates all of the computation nodes that were deactivated for power saving, and changes the status thereof to an idle state (step S13). Then, the power-saving management unit 51 returns to the process of step S1.

Figure 5:
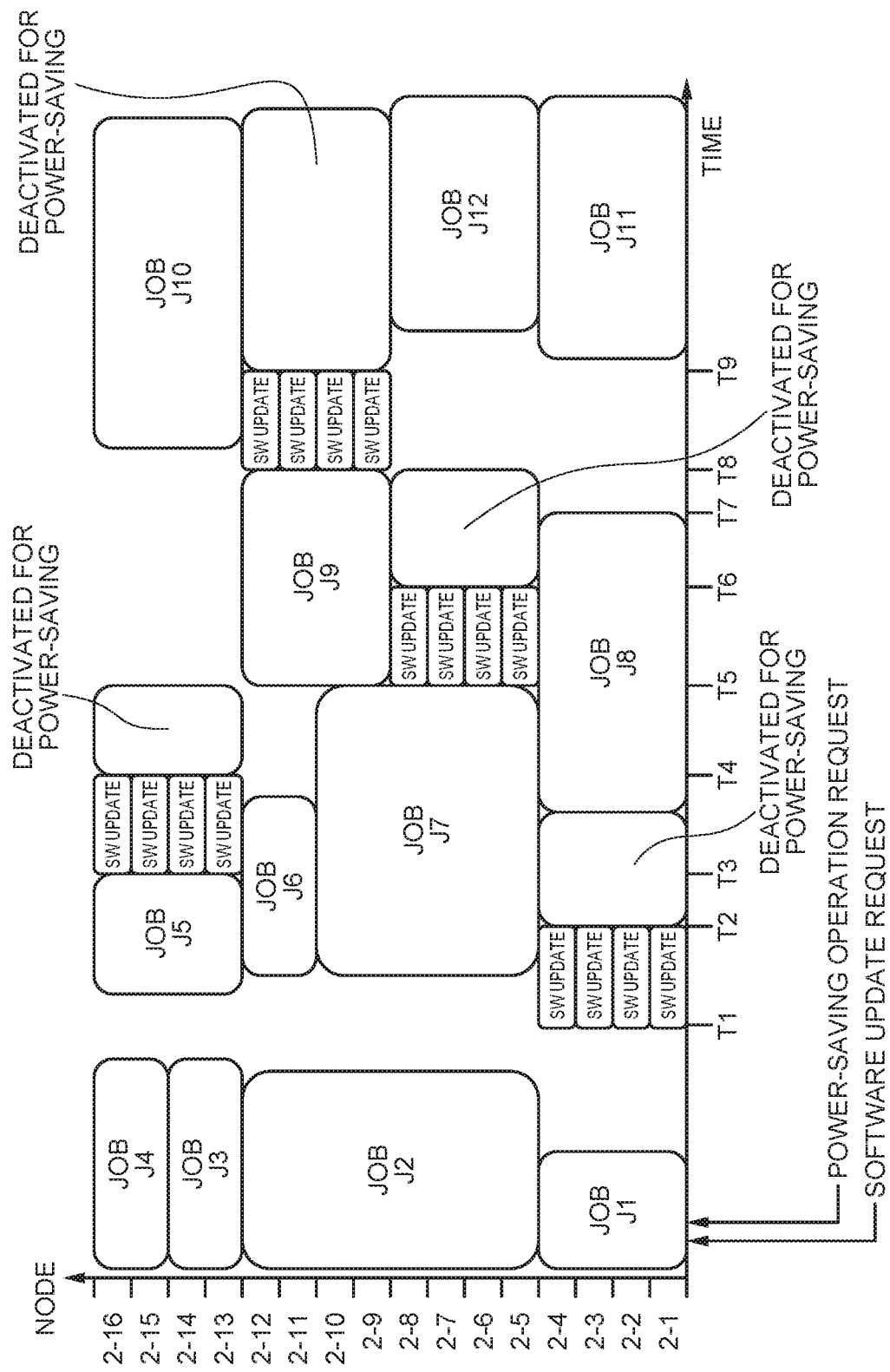
FIG. 5 is a diagram illustrating an example of state transition of computation nodes according to the first exemplary embodiment of the present invention.

FIG. 5 illustrates an example of computation node status transition. The vertical axis represents the computation nodes, and the horizontal axis represents a passage of time. In this example, the total number of computation nodes is sixteen. When the computation nodes 2-1 to 2-4 are executing a job J1, the computation nodes 2-5 to 2-12 are executing a job J2, the computation nodes 2-13 to 2-14 are executing a job J3, and the computation nodes 2-15 to 2-16 are executing a job J4, and a power-saving operation request and a software update request are input. The input software update request requests update of software in all of the computation nodes 2-1 to 2-N.

In FIG. 5, at time T1, the computation nodes 2-1 to 2-4 in which execution of the job J1 is completed and which are in an idle state for a predetermined time are selected as targets to be deactivated for power saving, and a software updating process is performed until time T2, and then the computation nodes are deactivated for power saving. Then, at time T3, as a job J5 ends in the computation nodes 2-13 to 2-16, the deactivated computation nodes 2-1 to 2-4 are activated, and instead, the computation nodes 2-13 to 2-16 are selected as targets to be deactivated for power saving. In the computation nodes 2-13 to 2-16, a software updating process is performed until time T4, and then they are deactivated for power saving. Thereafter, at time T5, as a job J7 ends in the computation nodes 2-5 to 2-10, the deactivated computation nodes 2-13 to 2-16 are activated, and instead, the computation nodes 2-5 to 2-8 are selected as targets to be deactivated for power saving. In the computation nodes 2-5 to 2-8, a software updating process is performed until time T6, and then they are deactivated for power saving. Thereafter, at time T7, although a job J8 is completed in the computation nodes 2-1 to 2-4, software update has been completed in the computation nodes 2-1 to 2-4. Accordingly, the computation nodes 2-1 to 2-4 are excluded from the targets to be deactivated for power saving. Thereafter, at time T8, as a job J9 ends in the computation nodes 2-9 to 2-12, the deactivated computation nodes 2-5 to 2-8 are activated, and instead, the computation nodes 2-9 to 2-12 are selected as targets to be deactivated for power saving. In the computation nodes 2-9 to 2-12, a software updating process is performed until time T9, and then they are deactivated for power saving. At this point, software update is completed in all of the computation nodes 2-1 to 2-16. Accordingly, the computation nodes 2-9 and 2-12 are kept as being deactivated for power saving thereafter.

As described above, according to the present exemplary embodiment, it is possible to realize power saving without stopping job operation of the computer system, and implement software update of the computation nodes. This is because software update is performed before deactivating the computation nodes for power saving. This means that in a state where some of the computation nodes are deactivated for power saving, it is possible to avoid the case where some other computation nodes are deactivated for software update. Therefore, there is no possibility that job operation of the computer system is stopped due to extreme shortage of computation nodes to which jobs are assignable.

Second Exemplary Embodiment

Next, a second exemplary embodiment of the present invention will be described.

Background of Present Exemplary Embodiment

A conventional large-scale computer system of HPC area is usually operated such that software update of the entire system is collectively carried out in a maintenance period once a half year. However, as a general-purpose Linux-based system is used recently, update is performed more frequently. In addition, as usages in association with an external system increase, users are increasingly demanding quick implementation of update related to security without waiting for the maintenance date. To cope with it, a method capable of implementing software update without setting a maintenance period, while continuing job operation, is needed. Further, in a recent computer system, power-saving operation is implemented in the entire system. Accordingly, software update of nodes in cooperation therewith is demanded.

Problem to be Solved by Present Exemplary Embodiment

In a large-scale computer system, when it is required to update OSs of a group of nodes executing calculation and application programs, it is usually handled by setting a maintenance time. During the maintenance time, the entire nodes of the computer system are deactivated, or maintenance target nodes are eliminated partly from the job operation management, and job operation is continued in a regenerate system. In the case where some nodes are updated partly, in order to execute a job by using only the updated nodes, measures must be taken to manage updated nodes and non-updated nodes as different node groups.

Also, in the case of updating job execution nodes sequentially during job operation, it is necessary to include a process of managing such information in a job scheduler, or to have cooperation with management software having such a function. In particular, in the case of realizing power-saving job execution in the entire system, it is necessary to manage deactivation of nodes by a power-saving function and implementation of software update without interfering with each other.

Features of Present Exemplary Embodiment

In the present exemplary embodiment, in a batch job scheduling operation of a computer system, a process of activation/deactivation of a computation node by a power-saving function of the batch job scheduling system and update timing of the OS and ISV software of the computation node are associated with each other, whereby software update of a computation node is implemented without stopping the job operation of the computer system. In addition, even in a state where versions of OSs and ISV software are not the same such as a case where OSs and ISV software of some computation nodes are updated but OSs and ISV software of the other computation nodes are not updated, appropriate computation nodes are assigned for jobs requiring OS and ISV environment.

Therefore, in the present exemplary embodiment, the job management system performs a node updating process together with a node deactivation/activation instruction by a power-saving function, preferentially assigns a job to an updated node, does not assign a job to a non-updated node, and allows a node deactivated state for power-saving, to thereby perform node update efficiently without stopping the job operation.

Configuration of Present Exemplary Embodiment

Figure 6:
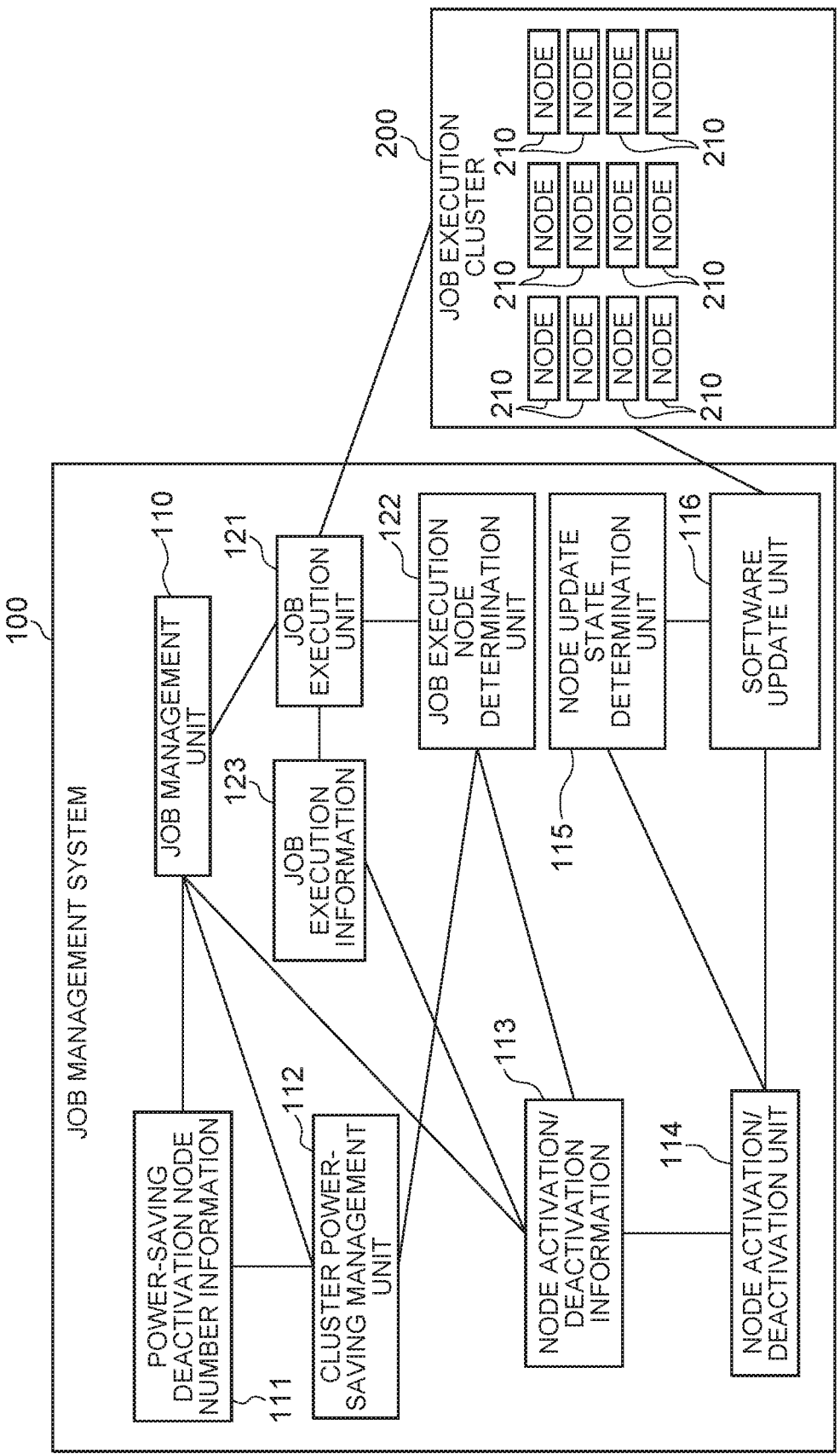
FIG. 6 is a block diagram illustrating a second exemplary embodiment of the present invention.

FIG. 6 is a block diagram of the present exemplary embodiment. Referring to FIG. 6, the present exemplary embodiment includes a job management system 100 and a job execution cluster 200. The job management system 100 is configured to include a job management unit 110, a power-saving deactivation node number information 111, a cluster power-saving management unit 112, node activation/deactivation information 113, a node activation/deactivation unit 114, a node update status determination unit 115, a software update unit 116, a job execution unit 121, a job execution node determination unit 122, and job execution information 123. The job execution cluster 200 is configured of a plurality of nodes 210. The job management system 100 is also referred to as a system management device. The node 210 is also referred to as a computation node. Here, the power-saving deactivation node number information 111, the cluster power-saving management unit 112, the node activation/deactivation information 113, and the node activation/deactivation unit 114 correspond to the power-saving management unit 51 of FIG. 1. Further, the node update status determination unit 115 and the software update unit 116 correspond to the software update management unit 52 of FIG. 1. Further, the job management unit 110, the job execution unit 121, and, the job execution information 123 correspond to the job management unit 53 of FIG. 1.

The present exemplary embodiment configured as described above functions as described below.

Operation of Present Exemplary Embodiment

When a software update request is made, the software update unit 116 stores the software update request in the node update status determination unit 115. The software update request includes nodes and software to be updated, and the updated software.

When a power-saving operation request is made, the job managing unit 110 sets the power-saving deactivation node number information 111. The power-saving deactivation node number information 111 represents the maximum number of nodes to be simultaneously deactivated for power saving. The power-saving deactivation node number information 111 may be included in the power-saving operation request, or may be set in advance.

Next, the job management unit 110 calls the cluster power-saving management unit 112 and initializes the node activation/deactivation information 113. The node activation/deactivation information 113 has an entry for each node 210. For initialization, "no deactivation time" is set to each entry. Next, the job management system 100 performs the following operations (1) to (3).

(1) The cluster power-saving management unit 112 selects the nodes 210 up to the number of nodes in the power-saving deactivation node number information 111 based on the node activation/deactivation information 113 and the job execution information 123, and calls the node activation/deactivation unit 114 for the nodes 210 to be deactivated.

(2) The node activation/deactivation unit 114 checks, by the node update status determination unit 115, whether or not a software updating process is required for the node 210 to be deactivated, and when the software updating process is required, calls the software update unit 116 and performs the software updating process.

Figure 7:
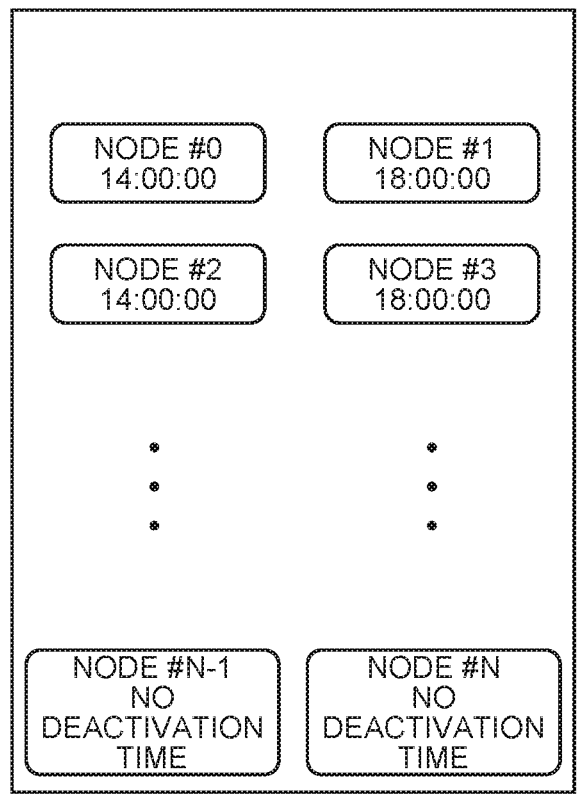
FIG. 7 is a diagram illustrating an example of node deactivation information according to the second exemplary embodiment of the present invention.

(3) After the software update process is completed by the software updating unit 116, the node activation/deactivation unit 114 sets the deactivation time in the information of the corresponding node 210 of the node activation/deactivation information 113, and deactivates the node 210. FIG. 7 illustrates an example of the node activation/deactivation information 113.

Through the processes of (1) to (3), before the nodes 210 of the number indicated in the power-saving deactivation node number information 111 are deactivated, the node activation/deactivation information 113 is updated after necessary software update is performed, and then the nodes 210 are in a deactivated state.

Then, when a job is submitted, the job management unit 110 calls the job execution node determination unit 122. The job execution node determination unit 122 refers to the node activation/deactivation information 113, and searches for the node 210 in which the deactivation time is set. When there is any node 210 searched successfully, the node activation/deactivation unit 114 performs an activation process of the node 210.

After the node 210 is activated by the node activation/deactivation unit 114, the job execution unit 121 updates the job execution information 123 and starts the job. At the same time, it calls the cluster power-saving management unit 112, and deactivates the nodes 210 up to the number indicated in the power-saving deactivation node number information 111 through the aforementioned processes (1) to (3). At that time, the node activation/deactivation unit 114 preferentially deactivates the nodes 210 other than the deactivated nodes 210.

Then, when a job requiring updated software is submitted, the job management unit 110 calls the job execution node determination unit 122, determines the node 210 in which the software is updated, and assigns the job to it based on the node activation/deactivation information 113, and the job execution unit 121 executes the job. If the number of the required nodes 210 having the updated software is not enough for the required job execution, the job waits for the resources and is not executed. The node 210 becomes an idle state, and is indicated as an idle state even in the job execution information 123.

The cluster power-saving management unit 112 selects the nodes 210 to deactivate them based on the job execution information 123 and the node activation/deactivation information 113, and implements the software update unit 116 and the node activation/deactivation unit 114 as described in (1) to (3) above.

Figure 8:
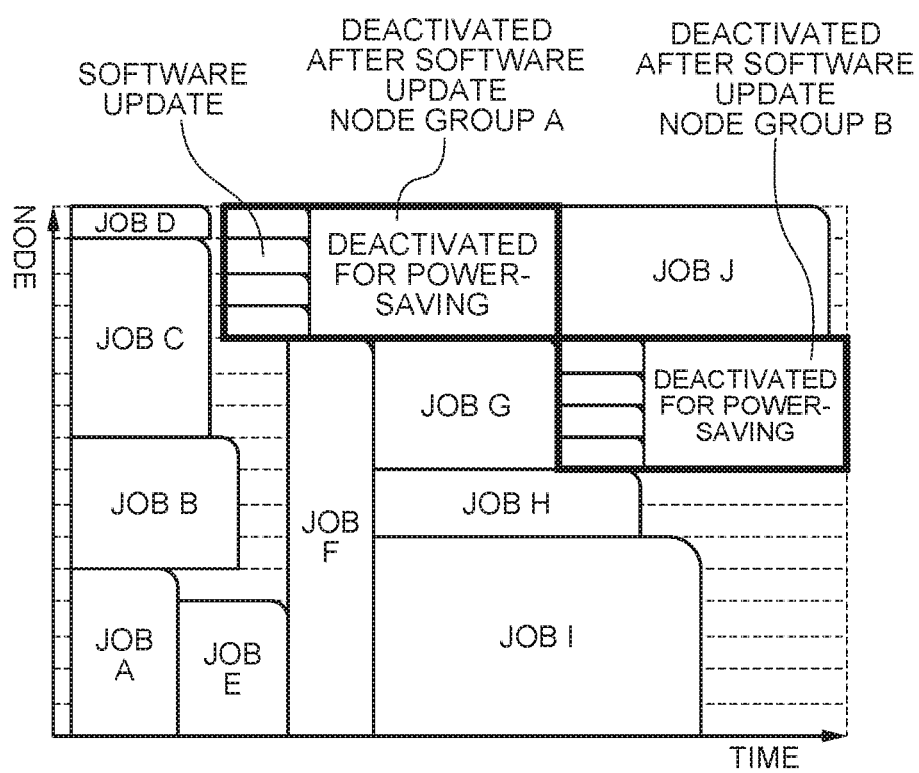
FIG. 8 illustrates specific examples of a job scheduling state, software update, and deactivation for power-saving, according to the second exemplary embodiment of the present invention.

FIG. 8 illustrates specific examples of a job scheduling state, software update, and power saving deactivation. After execution of a job C and a job D, a node group A is deactivated after the software update. Then, when a job J requesting updated software is submitted, the node group A is selected as nodes in which software is updated, and is activated to execute the job J. From the power-saving deactivation node information, a node group B of the same number is selected at the timing of activating the node group A, and is deactivated in place of the node group A. Thereby, the number of power-saving deactivation nodes is maintained.

In this way, software is updated while continuing the job operation.

Effect of Present Exemplary Embodiment

A first effect is that, by performing a software updating process on a node in conjunction with the timing of deactivation and activation of nodes using the power saving function by the job management system, it is possible to complete update of the entire nodes in the system without requiring special update node management.

A second effect is that even in the case where update of software is not uniform in the respective nodes, it is possible to execute a job by only using nodes in which software is updated while continuing the job operation.

Third Exemplary Embodiment

Next, a third exemplary embodiment of the present invention will be described.

Figure 9:
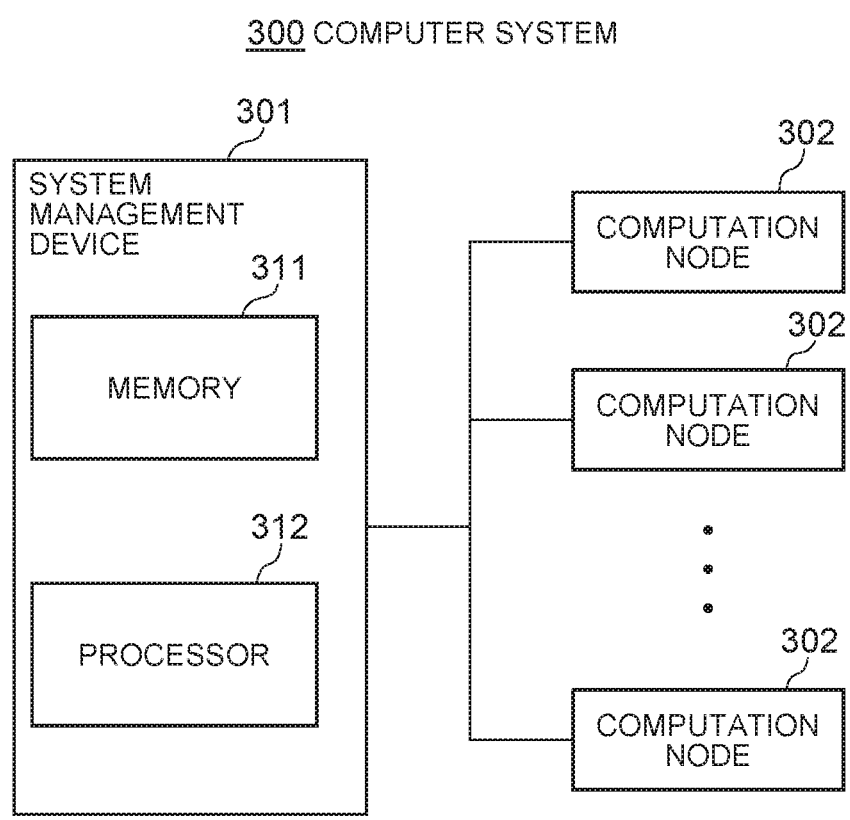
FIG. 9 is a block diagram illustrating a computer system according to a third exemplary embodiment of the present invention.

FIG. 9 is a block diagram illustrating a computer system according to a third exemplary embodiment of the present invention. Referring to FIG. 9, a computer system 300 according to the present exemplary embodiment includes a system management device 301 and a plurality of computation nodes 302. The system management device 301 includes a memory 311 and a processor 312.

The memory 311 includes program instructions. The processor 312 is connected with the memory 311.

The processor 312 is configured to create a list of the computation nodes 302 in which update of software is to be performed, in accordance with an input software update request.

The processor 312 is also configured to detect a computation node in an idle state satisfying a condition for power saving, in accordance with an input power-saving operation request. The processor 312 is also configured that when the detected computation node is on the list, the processor 312 deactivates the computation node 302 for power saving after the software of the computation node 302 is updated, while when the detected computation node is not on the list, deactivates the computation node 302 for power saving as soon as possible.

The computer system 300 according to the present exemplary embodiment configured as described above functions as described below. The processor 312 creates a list of the computation nodes 302 in which update of software is to be performed, in accordance with an input software update request. The processor 312 also detects a computation node 302 in an idle state satisfying a condition for power saving, in accordance with an input power-saving operation request. When the detected computation node 302 is on the list, the processor 312 deactivates the computation node 302 for power saving after the software of the computation node 302 is updated. Meanwhile, when the detected computation node 302 is not on the list, the processor 312 deactivates the computation node 302 for power saving as soon as possible.

As described above, according to the present exemplary embodiment, it is possible to realize power saving without stopping the job operation of the computer system, and to perform software update of the computation nodes. This is because software update is performed before deactivating the computation nodes for power saving.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention is applicable to power saving and software update in a computer system having a plurality of computation nodes.

The whole or part of the exemplary embodiments disclosed above can be described as, but not limited to, the following supplementary notes.

(Supplementary Note 1)

A system management device that manages a computer system having a plurality of computation nodes, the device comprising:

a software update management unit that stores a software update request when receiving the software update request for a computation node; and a power-saving management unit that, when receiving a power-saving operation request, notifies the software update management unit of a computation node in an idle state satisfying a condition for power saving among the plurality of the computation nodes, wherein the software update management units updates the software of the notified computation node, based on the software update request, and the power-saving management unit deactivates the computation node after the software update.

(Supplementary Note 2)

The system management device according to supplementary note 1, wherein when a computation node that is executing a job completes the execution of the job, the power saving management unit notifies the software update management unit of the computation node that completed the execution of the job, and activates the deactivated computation node, the software update management unit updates the software of the computation node notified based on the software update request, and the power-saving management unit deactivates the computation node after the software update.

(Supplementary Note 3)

The system management device according to supplementary note 2, wherein the power-saving management unit notifies the software update management unit of the computation node in which software update is not performed by the software update management unit, among the computation nodes that completed the execution of the jobs.

(Supplementary Note 4)

A control method performed by a system management device that includes a software update management unit and a power-saving management unit and manages a computer system having a plurality of computation nodes, the method comprising:

by the software update management unit, storing a software update request when receiving the software update request for a computation node;

by the power-saving management unit, when receiving a power-saving operation request, notifying the software update management unit of a computation node in an idle state satisfying a condition for power saving among the plurality of the computation nodes;

by the software update management units, updating the software of the notified computation node, based on the software update request; and by the power-saving management unit, deactivating the computation node after the software update.

(Supplementary Note 5)

The control method according to supplementary note 4, further comprising:

when a computation node that is executing a job completes the execution of the job, by the power saving management unit, notifying the software update management unit of the computation node that completed the execution of the job, and activating the deactivated computation node;

by the software update management unit, updating the software of the computation node notified based on the software update request; and by the power-saving management unit, deactivating the computation node after the software update.

(Supplementary Note 6)

The control method according to supplementary note 5, further comprising by the power-saving management unit, notifying the software update management unit of the computation node in which software update is not performed by the software update management unit, among the computation nodes that completed the execution of the jobs.

(Supplementary Note 7)

A program for causing a computer that manages a computer system having a plurality of computation nodes to function as:

a software update management unit that stores a software update request when receiving the software update request for a computation node; and a power-saving management unit that, when receiving a power-saving operation request, notifies the software update management unit of a computation node in an idle state satisfying a condition for power saving among the plurality of the computation nodes, wherein the software update management units updates the software of the notified computation node, based on the software update request, and the power-saving management unit deactivates the computation node after the software update.

(Supplementary Note 8)

The program according to supplementary note 7, wherein when a computation node that is executing a job completes the execution of the job, the power saving management unit notifies the software update management unit of the computation node that completed the execution of the job, and activates the deactivated computation node, the software update management unit updates the software of the computation node notified based on the software update request, and the power-saving management unit deactivates the computation node after the software update.

(Supplementary Note 9)

The program according to supplementary note 8, wherein the power-saving management unit notifies the software update management unit of the computation node in which software update is not performed by the software update management unit, among the computation nodes that completed the execution of the jobs.

REFERENCE SIGNS LIST

1 computer system
2-1~2-N computation node
3 system management device
4 bus
31 communication I/F unit
32 operation input unit
33 screen display unit
34 communication I/F unit
40 storage unit
41 program
42 power-saving operation request
43 software update request
44 computation node list
45 job queue
46 computation node status table
50 arithmetic processing unit
51 power-saving management unit
52 software update management unit
53 job management unit
100 job management system
110 job management unit
111 power-saving deactivation node number information
112 cluster power-saving management unit
113 node activation/deactivation information
114 node activation/deactivation unit
115 node update state determination unit
116 software update unit
121 job execution unit
122 job execution node determination unit
123 job execution information
200 job execution cluster
210 node
300 computer system
301 system management device
302 computation node
311 memory
312 processor

The invention claimed is:

1. A system management device that manages a computer system including a plurality of computation nodes, the device comprising:

a software update management unit that creates, among the plurality of the computation nodes, a list of one or more computation nodes in which update of software is required, in accordance with an input software update request;

a power-saving management unit that notifies the software update management unit of a first computation node in an idle state satisfying a condition for power saving among the plurality of the computation nodes, in accordance with an input power-saving operation request, wherein each of the software update management unit and the power-saving management unit is configured to include at least one processor, the software update management unit updates software of the first computation node based on the software update request, and deletes the first computation node from the list, the power-saving management unit deactivates the first computation node for power saving, and during deactivation of the first computation node for power saving, when detecting completion of execution of a job on a second computation node on the list, notifies the software update management unit of the second computation node, and activates the first computation node, the software update management unit updates software of the second computation node based on the software update request, and deletes the second computation node from the list, and the power-saving management unit deactivates the second computation node in response to activation of the first computation node in order to maintain a number of the computation nodes deactivated for power saving.

2. A method of controlling a computer system performed by a system management device that manages the computer system including a plurality of computation nodes, the system management device including a software update management unit and a power-saving management unit each configured to include at least one processor, the method comprising:

by the software update management unit, creating, among the plurality of the computation nodes, a list of one or more computation nodes in which update of software is required, in accordance with an input software update request;

by the power-saving management unit, notifying the software update management unit of a first computation node in an idle state satisfying a condition for power saving among the plurality of the computation nodes, in accordance with an input power-saving operation request;

by the software update management unit, updating software of the first computation node based on the software update request, and deleting the first computation node from the list;

by the power-saving management unit, deactivating the first computation node for power saving, and during deactivation of the first computation node for power saving, when detecting completion of execution of a job on a second computation node on the list, notifying the software update management unit of the second computation node, and activating the first computation node;

by the software update management unit, updating software of the second computation node based on the software update request, and deleting the second computation node from the list; and by the power-saving management unit, deactivating the second computation node in response to activation of the first computation node in order to maintain a number of the computation nodes deactivated for power saving.

3. A non-transitory computer readable medium storing a program comprising instructions for causing a computer that manages a computer system including a plurality of computation nodes to perform processing of:

creating, among the plurality of the computation nodes, a list of one or more computation nodes in which update of software is required, in accordance with an input software update request;

detecting a first computation node in an idle state satisfying a condition for power saving among the plurality of the computation nodes, in accordance with an input power-saving operation request;

updating software of the first computation node based on the software update request, and deleting the first computation node from the list;

deactivating the first computation node for power saving, and during deactivation of the first computation node for power saving, detecting completion of execution of a job on a second computation node on the list;

updating software of the second computation node based on the software update request, and deleting the second computation node from the list; and in order to maintain a number of the computation nodes deactivated for power saving, activating the first computation node and deactivating the second computation node.

\* \* \* \* \*